Figure 1:
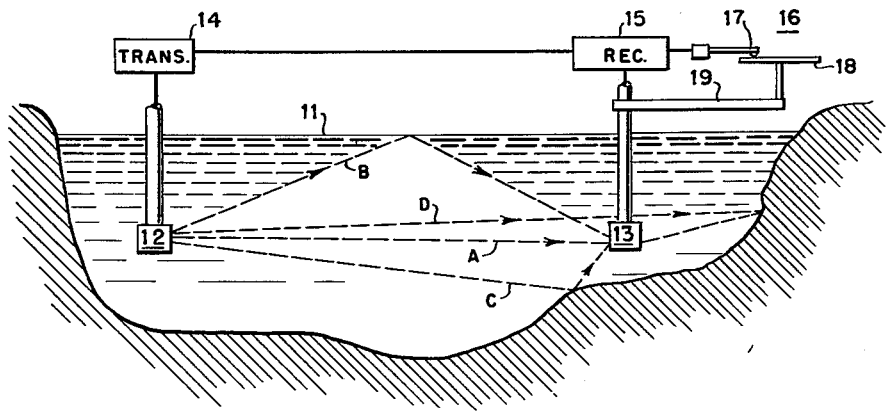

Sept. 5, 1961  E. C. GREGG, JR., ET AL  2,999,225
ELECTRONIC SWITCHING APPARATUS AND METHOD
Filed Jan. 20, 1955  2 Sheets-Sheet 1

INVENTORS
E.C. GREGG JR.
E.F. SHRADER
BY
ATTORNEYS

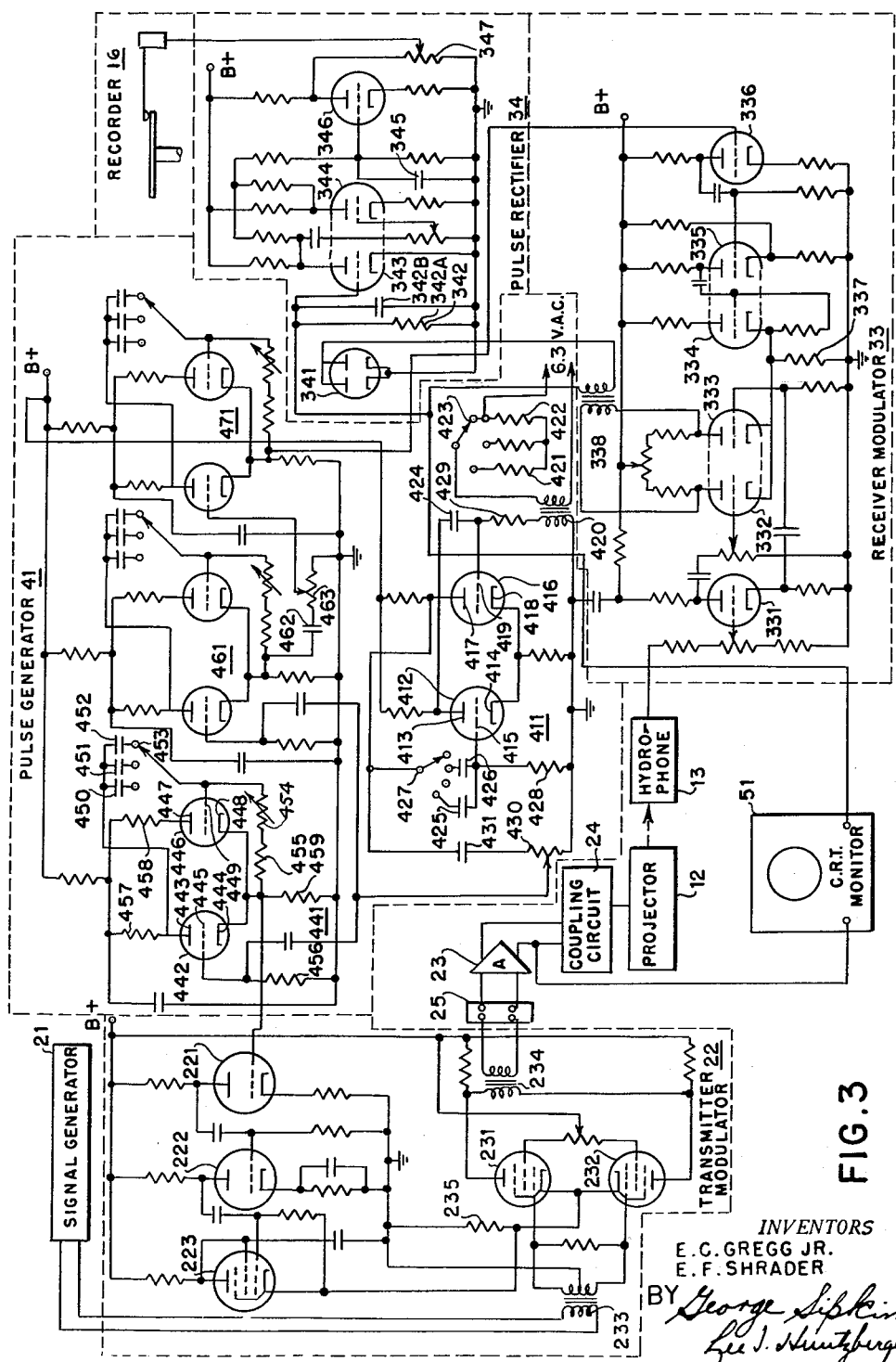

United States Patent Office 2,999,225
Patented Sept. 5, 1961

2,999,225
ELECTRONIC SWITCHING APPARATUS
AND METHOD
Earle C. Gregg, Jr., Chagrin Falls, and Erwin F. Shrader, East Cleveland, Ohio, assignors, by mesne assignments, to the United States of America as represented by the Secretary of the Navy
Filed Jan. 20, 1955, Ser. No. 483,185
10 Claims. (Cl. 340—8)

This invention relates to apparatus for controlling the time of response of electronic equipment to electrical signals and to a method of testing. More specifically, this invention relates to pulse-test equipment for ascertaining the characteristics of wave energy transducers and more particularly, underwater transducers such as projectors and hydrophones without resorting to free field tests such as in selected bodies of water.

This patent application is a continuation-in-part of the now abandoned patent application Serial Number 465,454, filed October 28, 1954, for Electronic Switching Apparatus and Method, by the same inventors as in the instant patent application.

In the operation of many types of electronic equipment which respond to signals of different forms and duration, it is often desirable and sometimes necessary for the proper operation of the equipment, to block the equipment during predetermined periods, and, in that manner, restrict the operation of the equipment to signals of a preselected type or to a preselected portion of a signal.

For example, teleprinters do not usually utilize the received signal in its entirety but will operate satisfactorily on only a portion of the signal. When the received signal contains recurrent distortion such as is due to echoes combining with the direct signal, it is often possible to eliminate the effects of the distortion by disabling the receiver during the periods the echoes are being received.

In testing of acoustic or electromagnetic transducers for directivity, reflected signals produce interference and erroneous results. To eliminate the effects of the reflected signals upon the equipment under test, it has been found that timed pulses can be transmitted to the transducer being tested, and the receiving equipment connected to the transducer can be unblocked only during the time the direct wave is being received. In this manner, the receiver is blocked during the time echoes reach the transducer, so that the tests are not effected thereby. In other words, a direct pulse can be received before other and interfering pulses are reflected from nearby objects for the purpose of determining the characteristics of the transducers alone. With particular reference to underwater transducers the direct pulses can be received before other and interfering pulses are reflected from nearby objects in the water and also the bottom and surface of the test location. Such pulse test in accordance with this invention can be carried out in tanks which, in turn, make possible working hydrostatic pressure and other type tests. The succeeding portions of this description are in the main concerned with underwater transducers. However, this is not intended in a limiting sense but merely for illustration.

Several methods may be used for reducing reflection effects when measuring or testing transducers in shallow water. These methods include the use of (1) frequency warble, (2) bands of resistance noise, and (3) pulsing. The latter has an appreciable advantage over the other two methods in that, while frequency warble and resistance noise bands average the reflections, these can be completely eliminated by pulsing. This, in the case of pulsing, is due to the fact that a band of sufficient width must be provided for the rapid building up and decay of the pulses.

A pulsing system in accordance with this invention consists of electrical circuit components for use over a wide frequency range to allow the production and recording of acoustical pulses of short duration. These components include a pulse generator, a transmitter modulator, a receiver modulator and a pulse rectifier.

A CW single frequency signal is applied to the input of the transmitter modulator. The transmitter modulator acts as a gating circuit. The signal output of the transmitter modulator consists of a pulse, i.e., finite train of constant amplitude waves of the signal frequency. The pulses may be observed and checked on a cathode-ray oscilloscope paralleled with the output of the modulator. The length and recurrence rate of these pulses are controlled by the pulse generator. The pulses are amplified and applied through an appropriate connection to the underwater transducer which serves as a sound source or projector. The nature of the resulting acoustic signal depends on the electroacoustic properties of the transducer.

The acoustic signal arrives at the detecting hydrophone at a time $$t = \frac{d}{c}$$

after the production of the acoustic signal. The velocity of sound in the medium is $c$, and $d$ is the distance between the projector and hydrophone.

The resulting signal generated by the hydrophone is amplified and applied to the receiver modulator. The receiver modulator is another gating circuit similar to the transmitter modulator. The receiving time is controlled by the pulse generator in such a manner that any portion of the received signal may be accepted for measurement and the rest rejected. To aid in the adjustment, the cathode ray oscilloscope is used to observe the incoming signal after it has passed through the receiver modulator. A switch on the modulator allows the comparison of the total signal with the portion accepted for measurement. This allows for the rejection of undesired reflections, which, if present in a CW measurement, result in an erroneous value for the signal level.

If the pulses occur at a rate exceeding a predetermined minimum of cycles per second, they are rectified by the pulse rectifier, producing a D.-C. voltage which is suitable for controlling the recorder control circuit.

The pulse generator produces the pulses governing the action of the transmitter and the receiver modulators. It consists of three unbalanced multivibrators, which when triggered, produce negative rectangular pulses. In addition to the multivibrators, there is a relaxation oscillator capable of being synchronized with various subharmonics of the 60 cycle filament supply. Short, sharp, positive impulses from this oscillator are used to trigger two of the multivibrator stages simultaneously. The rectangular pulse from one of the triggered multivibrator stages controls the transmitter modulator, the length of the rectangular pulse therefrom determining the length of the signal pulse from the transmitter modulator.

The negative rectangular pulse from the other of the triggered multivibrators is differentiated, yielding a sharp negative impulse at the beginning and a sharp positive impulse at the end. The remaining multivibrator is triggered by the sharp positive impulses from the second triggered multivibrator at a time after the first two multivibrators are triggered and determined by the length of the rectangular pulse from the second triggered multivibrator. The delayed rectangular pulse generated in the third multivibrator is used to control the active receiving time of the receiver modulator.

The recurrence rate of this sequence of events may be selected to be 60, 30, 15 or 3 times per second by means of a selector switch.

The pulse lengths of the multivibrators are controlled by the time constants of the associated RC circuits. Each multivibrator stage has two controls on the pulse length. A calibrated smooth control of the resistance covers a time ratio, and three fixed condensers give three possible decade selections of pulse length. With this arrangement, it is possible to cover a wide range of pulse duration on overlapping scales for each stage.

The transmitter modulator defines a most important aspect of this invention. The transmitter modulator is a balanced modulator which does not produce a D.-C. component in the transmitted signal. This feature minimizes the effects of unwanted transients which may be produced in the acoustic devices and the recording devices forming part of the system. The transmitter modulator is essentially a stage of push-pull amplification with a cathode resistor of another vacuum tube. The voltage drop across the cathode resistor due to the current drain of the other vacuum tube is made sufficient to bias the amplifying tubes of the push-pull stage beyond cut-off and render them incapable of passing any signal. A pulse from the pulse generator is amplified and the resulting large negative pulse is applied to the grid of the other tube, which latter stops conduction. For the duration of the pulse the push-pull stage of amplification acts normally. An output transformer is used with this push-pull stage of amplification in order to eliminate the D.-C. components due to the amplifying tubes passing from a nonconducting state to a conducting state and back again during the pulsing sequence. These components may be observed on a cathode ray oscilloscope when there is no signal. The D.-C. components are balanced by adjusting the screen grid potentials of the push-pull amplifier tubes. The output transformer of the push-pull amplifier may be any commercial type which has an essentially flat frequency characteristic over the frequency range handled by the system. The use of the balanced D.-C. modulator as described above, is a very important aspect of this invention.

The operation of the receiver modulator unit is very similar to the operation of the transmitter modulator described above. However, the operation characteristics are different. It is a high input impedance stage designed to work in conjunction with the amplifier of the recorder circuit. The modulator is capable of discriminating against the highest possible amplitude signal output of the cathode follower stage in the preceding amplifier. Hence, any part of the incoming signal may be selected without interference by the rest of the signal. This selection is controlled by adjustments on the pulse generator. The recurrent pulse output of the receiver modulator is converted into D.-C. voltage suitable for operating the power level recorder. The D.C. voltage produced must satisfy the following requirement:

The A.-C. component of the voltage must be smaller than the change in the D.-C. voltage represented by the resolution of the recorder (or, equivalently, the magnitude of this A.-C. component determines the resolution obtained without appreciable instability). This requirement is dictated by the nature of the recorder circuit.

An object of this invention is to provide novel and improved electronic apparatus for controlling the time of response of electronic equipment to electrical signals.

Another object of this invention is to provide novel and improved apparatus for controlling the blocking of electronic equipment for predetermined periods of time.

A further object of this invention is to provide novel and improved apparatus for the generation of electrical signals and for the control of equipment receiving said generated signals.

A further object of this invention is to provide novel and improved electronic switching apparatus for controlling the activation of electronic equipment, the switching period and frequency of switching being flexible and readily varied.

A further object of this invention is to provide a novel and improved method for testing communication equipment.

A further object is to provide pulse-test equipment for ascertaining the characteristics of transducers.

A further object is to provide pulse-test equipment for ascertaining the characteristics of underwater transducers including projectors and hydrophones without resorting to free field tests in selected bodies of water.

A further object is to provide pulse-test equipment for ascertaining the characteristics of underwater transducers without interference from reflected pulses.

A further object is to provide pulse-test equipment having a novel modulating arrangement for ascertaining the characteristics of underwater transducers without resort to free field tests in selected bodies of water.

A further object is to provide pulse-test equipment including a novel modulating arrangement which does not produce a D.-C. component, thereby minimizing the effect of unwanted transients which may be produced in associated acoustic and recording devices, which test equipment is adapted for ascertaining the characteristics of underwater transducers without resorting to free field test in selected bodies of water and without interference from reflected pulses.

Figure 2:
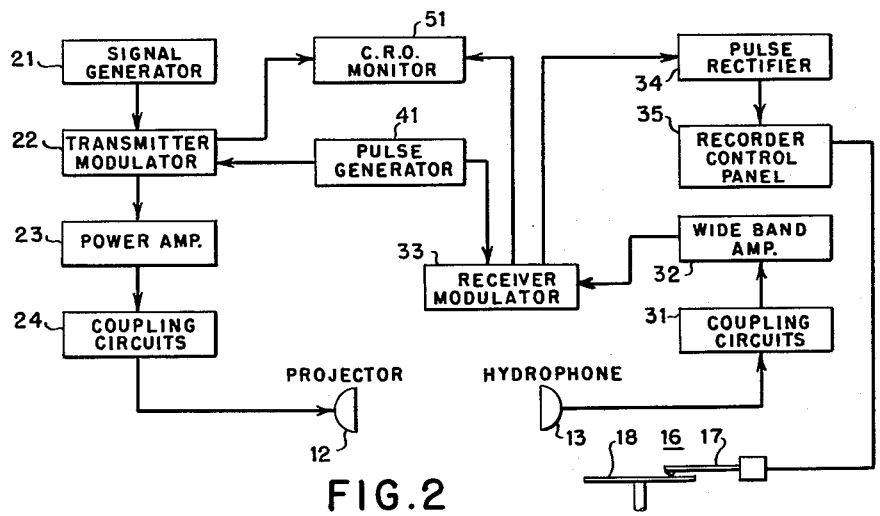

Other objects and advantages of the invention will hereinafter become more fully appaarent from the following description of the annexed drawings, which illustrate a preferred embodiment, and wherein:

FIG. 1 is a diagrammatic representation of an installation of underwater sound transducer test equipment, FIG. 2 is a block diagram of the transmitter and receiver apparatus of underwater sound transducer test equipment in accordance with this invention, and FIG. 3 is a circuit and block diagram of the apparatus of FIG. 2 showing details of structure.

Description

Referring to the drawings, and more particularly to FIG. 1, the reference numeral 11 designates a body of water such as a pond in which an acoustic projector 12 and an acoustic receiver or hydrophone 13 are suspended in spaced relation. The projector 12 and the hydrophone 13 may just as well be enclosed in a tank whereby tests may be conducted under a selected hydrostatic pressure. A transmitter 14 is connected to the projector 12 and generates electrical signals which are converted by the projector 12 into acoustic signals for transmission through the water 11. A hydrophone 13 picks up the acoustic signals from the projector 12 and converts them into electrical signals. The hydrophone 13 is connected to a receiver 15 which controls a recorder 16. The recorder 16 comprises a pen 17 and a turntable 18 carrying a recording medium. The hydrophone 13 is rotatively supported in the water 11, and the turntable of the recorder 16 is connected by an appropriate linkage 19 to the hydrophone 13 to rotate therewith.

Although the details of the recorder are not a part of this invention, a brief description of its structure will enable a clearer understanding of the entire apparatus. The turntable 18 is secured to its shaft through a friction coupling so that it may be manually preset to any position. The electrical output of the receiver 15 controls the movement of the recording pen 17 so that this movement corresponds to the output of the receiver 15. The recorder 16 thus records the amplitude of the signal received by the hydrophone 13 with respect to its angular position.

The energy from the projector 12 forms a directional pattern having its apex at the projector 12. For the proper determination of the directivity patterns of hydrophones, the signal which is transmitted directly through the water from the projector 12 to the hydrophone 13 is preferred. However, the hydrophone 13 often receives indirect or reflected signals, signals which are reflected from the walls of the container or from the surface or bed of the water, as well. Such possible signal paths from the projector 12 to the hydrophone 13 are shown by dashed lines in FIG. 1 in which the direct signal is designated A; a portion of the energy from the projector 12 which is reflected from the surface of the water to the hydrophone 13 is designated B; another portion which is reflected from irregularities on the bottom of the container is designated C; and another portion which is reflected from the far wall of the container is designated D. Since the paths of the reflected waves are longer than that of the direct waves, the reflected signals arrive at the hydrophone 13 after the direct signal. The effect of the reflected signals upon the record of the test is a broadened time of response of the hydrophone 13, erroneous amplitude indications, and erroneous directivity patterns.

The apparatus shown in block form in FIG. 2 overcomes the deleterious effects of reflected energy upon the test results. The transmitter 14 comprises a signal generator 21 which generates a single frequency electrical signal and applies it to a transmitter modulator 22. The output of the transmitter modulator 22 is fed to a power amplifier 23 where the signal is amplified to a level suitable for underwater transmission. The power amplifier 23 is connected through suitable coupling circuits 24 to an acoustic projector 12.

The hydrophone 13 is connected to a wide band amplifier 32 through appropriate coupling circuits 31. The output of the wide band amplifier 32 is connected to a receiver modulator 33, the output of which is connected to a pulse rectifier 34. The output of the pulse rectifier 34 is connected to the recorder 16 through a recorder control panel 35 to control the movement of the recorder pen 17.

A pulse generator 41 has one output connected to the transmitter modulator 22 and another output connected to the receiver modulator 33 to control first the broadcast of test signals and second the periods during which the receiver is unblocked, respectively. A cathode-ray-tube oscilloscope monitor 51 is connected to the transmitter and receiver modulators 22 and 33.

The details of the circuits of the transmitter and receiver modulators 22 and 33, the pulse rectifier circuit 34, the pulse generator circuit 41 and the power amplifier circuit 23 are shown in FIG. 3. The recorder control panel 35, the coupling circuits 31 and the details of the signal generator 21, the coupling circuits 24 and the monitor 51 are conventional and are not shown.

In FIG. 3, the output of the signal generator 21 is connected through an input transformer 233 to the input of the transmitter modulator 22 which comprises a push-pull stage of amplification including tubes 231 and 232. The output is taken from an output transformer 234. A cathode resistor 235, common to the two tubes 231 and 232, is also shared by a beam power tube 223. The beam power tube 223 is driven by two cascaded resistance-capacitance coupled triode stages 221 and 222, whose input is connected to the pulse generator 41. Of very significant importance in this circuit is that the output transformer 234 serves to eliminate D.-C. components from the tubes 231 and 232 when passing from a non-conducting state to a conducting state and back again during the pulsing sequence. The D.-C. components are balanced by adjusting the screen grid potentials of the tubes 231 and 232. The circuit acts as a balanced modulator. This balanced modulator arrangement minimizes the effect of unwanted transients which are producible in the acoustic devices and recording devices of this system by D.-C. pulses such as would be generated by an unbalanced modulator if used in this circuit.

The output from the transmitter modulator is coupled through an attenuator pad 25, a power amplifier 23 and coupling circuit 24 to the projector 12.

The hydrophone 13 is connected to the input of the receiver modulator 33. The operation of the receiver modulator 33 is very similar to the operation of the transmitter modulator 22. It comprises a paraphase amplifier 331 driving a push-pull stage comprising tubes 332 and 333. A power amplifier tube 334, which shares a cathode resistor 337 common to the tubes 332 and 333, is driven by two cascaded resistance-capacitance coupled triode amplifiers 336 and 335, the input to which is connected to one of the outputs of the pulse generator 41. The output from the tubes 332 and 333 is connected through an output transformer 338 to the input of the pulse rectifier 34. The operation characteristics of the receiver modulator 33 are somewhat different from those of the transmitter modulator 22. The receiver modulator 33 is a high input impedance stage and is adapted to work in conjunction with the amplifier of the recorder circuit. The receiver modulator 33 is capable of discriminating against the highest possible amplitude signal output of the cathode follower stage in the preceding wide band amplifier 32, shown in FIG. 2 but omitted in FIG. 3. Hence any part of the incoming signal may be selected without interference by the rest of the signal. This selection is controlled by adjustments on the pulse generator 41.

The pulse rectifier 34 comprises a double diode 341 connected as a half-wave rectifier which is connected across a resistive-capacitive filter 342 comprising a resistor 342A in parallel with a capacitor 342B and to an impedance changer and phase inverter tube 343. The output of the tube 343 is connected to the inputs of triodes 344 and 346. The output of the triode 344 is also connected to the input of the triode 346. The output of the triode 346 is applied through a potentiometer 347 to the recorder 16.

The passage of a signal generated by the signal generator 21 through both the transmitter 14 and the receiver 15 is controlled by the pulse generator 41. The pulse generator 41 comprises a free-running multivibrator relaxation oscillator 411 which comprises a triode 412 having an anode 413, a cathode 414, and a control grid 415 and a triode 416 having an anode 417, a cathode 418 and a control grid 419. A source of alternating current (not shown) is connected to the control grid 419 through a transformer 420. Resistors 421 and 422 are connected in parallel with each other and in series with a selector switch 423 and the source of alternating current. A capacitor 424 is connected at one end to control grid 419 and at its other end to the anode 413, and capacitors 425 and 426 are each connected together and to control grid 415 at one end and through a selector switch 427 to anode 417 at the other end. A resistor 429 connects the control grid 419 to ground and a resistor 428 connects the control grid 415 to ground. The output from the relaxation oscillator 411 is taken from a potentiometer 430 which is connected through a capacitor 431 to the selector switch 427 and to the anode 417.

The output of the relaxation oscillator 411 is connected to the input of an unbalanced or one-shot multivibrators 441 and 461 which are similar in structure. The multivibrator 441 comprises a triode 442 having an anode 443, a cathode 444 and a control grid 445 and a triode 446 having an anode 447, a cathode 448 and a control grid 449. Capacitors 450, 451 and 452 are connected at one end through a selector switch 453 to the control grid 449 and at the other end to the anode 443. A variable resistor 454 is connected in series with a resistor 455 between the control grid 449 and the cathode 448. A resistor 456 is connected between the control grid 445 and the ground. The input to the multivibrator 441 from the relaxation oscillator 411 is applied across the resistor 456.

The cathodes 444 and 448 are connected together and through a resistor 459 to ground, and a resistor 457 connects the anode 443 and a resistor 458 connects the anode 447 to a source of high positive potential (not shown). The resistors 457 and 458 are of different values so that the multivibrator 441 is not free running. A cathode resistor 459 connects both cathodes 444 and 448 to ground.

The multivibrator 461 and another unbalanced multivibrator 471 are similar in structure to the multivibrator 441 and will not be described in detail. The output from the multivibrator 441 is taken across the cathode resistor 459 and is applied to the input of the triode 221 of the transmitter modulator 22. The output from the multivibrator 461 is taken from across its cathode resistor connected to a differentiation circuit comprising a capacitor 462 and a resistor 463, and applied to the input of the multivibrator 471. The output of the multivibrator 471 is taken from across its cathode resistor and is applied to the input of the triode 336 of the receiver modulator 33.

Operation

A single frequency electrical signal is generated by the signal generator 21 and is applied through the input transformer 233 to the input of the push-pull tubes 231 and 232 in the transmitter modulator 22. However, the tubes 231 and 232 are normally cut-off by a large bias which is developed across the cathode resistor 235 due to the current flow through the power tube 223 which is normally conducting. The power tube 223 is cut off by a negative pulse applied to its input from the triode 222 which has a positive pulse applied to its input by the triode 221. The input to the triode 221 is a negative pulse from the pulse generator 41.

When the power tube 223 is cut off, the current flow through the resistor 235 and the bias on the tubes 231 and 232 are reduced, allowing these tubes to conduct the signal generated by the signal generator 21 for the duration of the pulse from the pulse generator 41. The amplified output of the transmitter modulator 22 is applied to the projector 12 which transmits an acoustic signal through the body of water 11 to the hydrophone 13.

Acoustic signals which are received by the hydrophone 13 are converted into electrical signals, are amplified in amplifier 32 (FIG. 2), and are applied to the input of the receiver modulator 33 which functions in the same manner as the transmitter modulator 22. The push-pull tubes 332 and 333 are normally cut off by the bias developed across the cathode resistor 337 by the current flow through power tube 334. The power tube 334 is cut off to allow conduction through the tubes 332 and 333 by a negative pulse which is applied to its input from the triode 335 which received a positive pulse from the triode 336. The triode 336 receives a negative pulse from the pulse generator 41.

The signal output from the push-pull tubes 332 and 333 of the receiver 15 is applied through the transformer 338 to the input of the pulse rectifier 34 which converts the alternating signal from the hydrophone 13 into a direct signal for controlling the recorder 16. The diode 341 rectifies the signal from the receiver modulator 33 and the resultant pulsating output is applied to the filter 342. The time constant of the filter 342 is such that the capacitor 342B is charged to peak value during each half cycle in which the half wave rectifier 341 conducts. The capacitor 342B discharges through the resistor 342A during interval between successive acoustic pulses, producing a saw-tooth wave. The saw-tooth wave is applied to the input of the triode 343, and the output of the triode 343 is applied to the input of the triode 344 and to the input of the triode 346. The output of the triode 344 is also applied to the input of the triode 346, but is inverted in phase from the output of the triode 343. The outputs of the triodes 343 and 344 are applied to the triode 346 across the integrating circuit 345 and are integrated thereby, producing a direct signal which is related to the amplitude of the signal received by the hydrophone 13. By way of further explanation of the operation of the pulse rectifier 34, let it be considered that the receiver modulator 33 is adjusted to pass a short pulse of the acoustic signal to be measured. This pulse input to the pulse rectifier is rectified by the action of the diode 341. A condenser 342B is made small in order that it be charged to peak value within the duration of the pulse. The resistor 342A is adjusted so that $$\frac{1}{RC}$$

is approximately equal to the pulse repetition frequency at the input to transformer 328. This allows the condenser to become almost wholly discharged between pulses. Hence the grid signal is a saw-tooth wave whose amplitude can change rapidly with change in the incoming pulse. The tube 343 acts as an impedance changer and phase inverter. The voltage at its plate contains the D.-C. and A.-C. components of the rectified signal at its grid. The A.-C. component of this voltage is applied to the grid of the tube 344 through the RC network which has an adjustable pickoff tap. The time constant of this RC combination is approximately equal to that of the filter section 342. By proper adjustment, the signal at the plate of tube 344 is made equal to the A.-C. component of the signal at the plate of tube 343, but inverted in phase. To facilitate this adjustment, connection may be made to a cathode ray oscilloscope observation to a terminal, not shown. The resultant mixed voltage at the junction of the pair of resistors connected to the respective plates of the two tubes 343 and 344 is approximately equal to one-half the D.-C. component of the voltage at the plate of the tube 343 with the A.-C. components balanced out. An increase in the intensity of the received acoustic signal causes the D.-C. voltage described above to rise. The final tube 346 is used to produce the proper relation between the D.-C. output voltage and the input signal for application to the control circuit of the recorder 16.

To insure reception by the hydrophone 13 of only the direct signals from the projector 12 to the exclusion of reflected signals, the output from the transmitter modulator 22 is pulsed and the receiver modulator 33 is unblocked only during the times the direct signal is being received by the hydrophone 13. The triggering pulses for pulsing the transmitter 14 and unblocking the receiver 15 are generated by the multivibrator relaxation oscillator 411 which is a free running oscillator. The oscillator 411 is synchronized with the local 60 cycle alternating current which is applied through the transformer 420, the resistors 421 and 422 and switch 423. The synchronizing voltage is applied to the control grid 419 of the triode 416, and on positive half-waves of the alternating current, the negative bias applied to the grid 419 is reduced allowing tube 416 to conduct. When tube 416 conducts, the voltage at its anode 417 is reduced and one of the capacitors 425 or 426 (whichever is connected into the circuit by the switch 427) discharges, drawing current through the resistor 428 and driving the control grid 415 negative until tube 412 cuts off. When the capacitor 425 or 426 is stabilized, the current through the grid resistor 428 is reduced to zero and the bias on the tube 412 is reduced until the tube 412 again conducts. Conduction through the tube 412 reduces the voltage of its anode 413, and the capacitor 424 discharges through the resistor 419, increasing the bias on the tube 416 until it cuts off. The amplitude of the applied synchronizing voltage may be controlled by setting the switch 423 to connect either or both of the resistors 421 and 422 into the synchronizing voltage circuit. The frequency of the oscillator 411 is controlled by the values of one of the capacitors 425 or 426 either of which may be connected into the circuit of the control grid 414 by the switch 427 to control the time constant of that circuit.

The output of the relaxation oscillator 411 is taken from the potentiometer 430 in the circuit of the anode 417 and is applied to the control grid 445 of the unbalanced multivibrator 441. The anode resistor 458 is smaller in value than the anode resistor 457 and the tube 446 is normally conducting since its anode voltage is higher than that of tube 442. When a positive pulse is supplied to the control grid 445 from the relaxation oscillator 411, the tube 442 begins conducting causing additional current to flow through the cathode bias resistor 459 and increasing the negative bias applied to both the tube 442 and 446. The pulse applied to the tube 442 maintains that tube conductive, but the increase in bias causes tube 446 to cut off. The anode voltage of the tube 442 decreases with conduction, causing one of the capacitors 450, 451 or 452 (whichever may be connected into the circuit by the switch 453) to discharge and draw current through the resistors 454 and 455. The voltage drop across the resistors 454 and 455 cuts off the tube 446 and maintains it cut off even after the positive pulse applied to the control grid 445 decays. When the voltage across the capacitor 450, 451, or 452 which is connected into the circuit by the switch 453 has stabilized, the current flow through the resistors 454 and 455 decreases to zero, allowing the tube 446 to again conduct.

With both tubes 442 and 446 conducting, the bias across the cathode resistor 459 increases until one tube cuts off. Since the anode voltage of the tube 442 is the lower one, this tube cuts off before the tube 446. The output from the multivibrator 441 is taken across the cathode resistor 459 and is applied to the input of the tube 221 of the transmitter modulator 22. The duration of the pulses from the multivibrator 441 is controlled by the value of the capacitors 450, 451 or 452 connected into the circuit and by the value of the variable resistor 454.

The multivibrators 461 and 471 operate the same as the multivibrator 441. For a more complete description of the multivibrator circuits 411, 441, 461 and 471, reference is made to "Radar Electronic Fundamentals," NavShips 900,016, published by U.S. Navy Department, pages 192–212, and "Ultra-High Frequency Techniques," by Brainerd, Koehler, Reich and Woodruff, published by D. Van Nostrand, 1942, pages 171–177 and 182–183. The output of the relaxation oscillator 411 is applied to the input of the multivibrator 461 and the output of the multivibrator 461 is applied to the input of the multivibrator 471. The output of the multivibrator 471 is applied to the input of the tube 336 of the receiver modulator 33 to control the conduction therethrough. The output pulse from the multivibrator 461 is differentiated by the capacitor 462 and the resistor 463 to produce a sharp positive pulse at its trailing edge. It is the sharp pulse which occurs at the trailing edge of the output pulse from the multivibrator 461 which triggers the multivibrator 471. Therefore, the output from the multivibrator 471 occurs after the output pulse from the multivibrator 441. By varying the length of the pulse from the multivibrator 461, the time of occurrence of the output from the multivibrator 471 can be varied, and the receiver 15 can be unblocked at the desired time after transmission of the signal through the transmitter 14. The variation of the length of the pulse output of the multivibrator 471 controls the length of time that the receiver 15 is unblocked.

The cathode-ray-tube monitor 51 has its input connected to both the receiver modulator 33 and to the transmitter modulator 22 so that the signal passing through each of these circuits may be viewed. In this manner, the pulse generator multivibrators 441, 461 and 471 may be adjusted so that desirable portions of the signals are transmitted through the transmitter 14 and the receiver 15.

The apparatus of this invention provides an efficient and positive means for eliminating cyclically recurring interference, such as echoes, from the signals transmitted directly from a transmitter to a receiver. By transmitting pulses and controlling the unblocking of the receiver to receive only the direct signal, and by maintaining the receiver blocked during the reception of the later received signals such as echoes, the effect of interference for test or communication purposes is eliminated.

Obviously many modifications and variations of the present invention are possible in the light of the above teachings. It is therefore to be understood that within the scope of the appended claims the invention may be practiced otherwise than as specifically described.

We claim:
1. Transmitting and receiving apparatus comprising a signal generator for generating electrical signals, a first amplifier connected to said signal generator, said first amplifier being biased beyond cut-off, a fixed radiator connected to said first amplifier for radiating signals which pass through said first amplifier, a rotatable transducer for receiving signals radiated by said radiator, a second amplifier connected to the output of said rotatable transducer, said second amplifier being biased beyond cut-off, a pulse generator for generating electrical pulses, a first means connected to the output of said pulse generator for unbiasing said first amplifier for a first predetermined period of time in response to the pulse output from said pulse generator, second means connected to the output of said pulse generator for unbiasing said second amplifier for a second predetermined period of time in response to the output of said pulse generator, and a recording means mechanically coupled to said rotatable transducer and electrically coupled to the output of said second amplifier.

2. Transmitting and receiving apparatus comprising a signal generator for generating electrical signals, a first push-pull balanced amplifier connected to said signal generator, said first amplifier being biased beyond cut-off, a radiator connected to said first amplifier for radiating signals which pass through said first amplifier, a receiver for receiving signals radiated by said radiator, a second push-pull balanced amplifier connected to the output of said receiver, said second amplifier being biased beyond cut-off, a pulse generator for generating electrical pulses, a first means connected to the output of said pulse generator for unbiasing said first amplifier for a first predetermined period of time in response to the pulse output from said pulse generator, and second means connected to the output of said pulse generator for unbiasing said second amplifier for a second predetermined period of time in response to the output of said pulse generator, said pulse generator comprising a relaxation oscillator, said oscillator comprising variable timing means whereby the frequency output of said oscillator may be varied, a first unbalanced multivibrator connected to said oscillator to be triggered thereby to produce a first single square wave output, said first single square wave output being applied to said first means to control the bias on said first amplifier, a second unbalanced multivibrator connected to said oscillator to be triggered thereby to produce a second single square wave, a differentiation circuit connected to the output of said second multivibrator to differentiate said second single square wave and produce a single sharp negative pulse at the leading edge and a single sharp positive pulse at the trailing edge of said second single square wave, a third unbalanced multivibrator connected to the output of said differentiation circuit and responsive to said single sharp positive pulse to produce a third single square wave, said third single square wave being applied to said second means to control the bias on said second amplifier.

3. The apparatus defined in claim 2 wherein each said first, second and third multivibrators comprise individual means for adjusting the length of said first, second and third single square waves, respectively, whereby the period of unbiasing of said first and second amplifiers may be adjusted.

4. Apparatus for testing transducers, said apparatus comprising a CW signal generator, a first balanced power amplifier connected in circuit with said signal generator for amplifying the CW signal output therefrom without introducing direct current components into the CW signals, a radiator connected in circuit with said first power amplifier for radiating said CW signal in an appropriate medium, a second balanced power amplifier for amplifying received CW signal energy originating at said radiator and without introducing direct current components into the received CW signal energy, a recording means connected to said second power amplifier for indicating the amplitudes of signals that pass through said second power amplifier, means connected to said first power amplifier for sequentially blocking and unblocking said first power amplifier to produce a pulsed CW signal output therefrom, and means connected to said second power amplifier for sequentially blocking and unblocking said second power amplifier to permit transmission of received signals therethrough at only predetermined times and for predetermined periods of time, whereby a receiver transducer is adapted to be connected to the input of said second amplifier and adapted to be disposed for receiving signals radiated by said radiator to permit performance characteristics of the receiver transducer to be ascertained.

5. Apparatus for testing transducers as defined in claim 4 further comprising means fixedly supporting said radiator and a rotatable mounting for supporting a receiver transducer, said rotatable mounting being mechanically coupled to said recording means.

6. Apparatus for testing transducers, said apparatus comprising a signal generator for generating an electrical test signal, a push-pull balanced amplifier having its input connected to the output of said signal generator for the amplification of said test signal, first means connected in circuit with said push-pull balanced amplifier for biasing said first amplifier beyond cut off, a transmitting transducer having its input connected in circuit with the output of said push-pull balanced amplifier for transmitting said test signal, a rotatable mounting adapted for supporting a receiving transducer for receiving said transmitted test signal, a second push-pull balanced amplifier whose input is adapted to be connected in circuit with the output of a receiving transducer supported in said rotatable mounting, second means connected to said second push-pull balanced amplifier for biasing said second amplifier beyond cut-off, a pulse generating means, a first pulse responsive means connected to said pulse generating means and to said first means for unbiasing said first push-pull balanced amplifier in response to pulses from said pulse generating means, a second pulse responsive means connected to said pulse generating means and to said second means for unbiasing said second push-pull balanced amplifier in response to pulses from said pulse generating means a predetermined time after the unbiasing of said first push-pull balanced amplifier, and recorder means mechanically coupled to said rotatable mounting and connected to the output of said second amplifier.

7. A method of testing a communication transducer, said method comprising the steps of normally blocking any output from the test transducer, transmitting from a source that is spaced from the test transducer timed pulses of a continuous wave signal, whereby a fraction of the transmitted pulse energy traverses a direct path from the source to the test transducer and in a particular transit time, unblocking the output from the test transducer coincident with the elapse of the transit time pursuant to a transmitted pulse, and then blocking the output from the test transducer before any energy of the transmitted pulse reflected from obstacles arrives at the test transducer, and measuring the output amplitude of the test transducer.

8. Apparatus for testing transducers comprising: a signal generator for generating a continuous-wave test signal; a first balanced push-pull amplifier coupled at its input end to the output end of said signal generator for amplifying the test signal without superimposing either direct current voltages or transients stemming from direct current voltages onto the signal, said first balanced amplifier including an output transformer and a common cathode resistor; an electronic tube whose cathode is connected to said cathode resistor whereby cathode current of said amplifier and of said tube pases through said cathode resistor in the same direction; means for rendering said electronic tube conductive whereby current flowing therethrough produces a bias voltage across said common cathode resistor sufficient for cutting off said first balanced amplifier; a transmitting transducer having its input end coupled to the output of said first balanced amplifier for transmitting said test signal; a receiving transducer for intercepting the test signal; a second push-pull balanced amplifier coupled at its input end to the output end of said receiving transducer, said second balanced amplifier including an output transformer and a common cathode resistor; a second electronic tube whose cathode is connected to said cathode resistor whereby cathode current of said second amplifier and of said second electronic tube passes through said last-mentioned cathode resistor in the same direction; means for rendering conductive said second tube whereby current flowing therethrough produces a bias voltage across said common cathode resistor sufficient for cutting off said second balanced amplifier; means coupled to the first-mentioned tube and said second tube for cutting off momentarily said first-mentioned tube to permit said first balanced amplifier to amplify and pass the test signal from said signal generator, and coupled to said second tube for cutting off momentarily said second tube a period of time later substantially equal to the time required for signal transfer from said transmitter transducer to said receiver transducer.

9. Apparatus for use in obtaining a recording of sensitivity versus angular orientation of a transducer in a particular relatively homogeneous environment wherein the transducer is capable of converting wave energy of particular characteristic incident thereto in said environment into electrical energy and where the environment continuity is so limited that wave energy echoes off terminations of the environment can interfere with the making of accurate performance measurements and where the speed of said wave energy through said environment under selected ambient conditions is known, comprising rotatable means for supporting said transducer in said environment in various angular positions, means for transferring said wave energy to said environment, means for supporting said wave energy transfer means at a location spaced from said transducer support and along a line of sight to said transducer support, recorder means coupled to said angularly adjustable transducer support for recording the electrical output of said transducer as a function of angular orientation, means for transferring the electrical output of said transducer to said recorder means, and gating means coupled to said wave energy transfer means and to said means for transferring the electrical output of said transducer to said recorder, for causing the output of the former to be in the form of timed pulses and the electrical output of the latter to be in corresponding timed pulses at a phase relative to the transmitted pulses such that energy traversing only the line of sight path between the two supports is recorded.

10. Apparatus for time-controlling the passage of an alternating electrical signal through electronic equipment and without superimposing direct current components or the alternating current signal passed through; said apparatus comprising a balanced electronic push-pull amplifier for amplifying electrical signals applied thereto and having an output transformer; a common cathode resistor connected in series with said push-pull amplifier; an electronic amplifier tube also connected in series with said common cathode resistor; a direct current power supply connected to said push-pull amplifier and to said electronic amplifier tube; means for causing said electronic amplifier tube to conduct whereby current flowing therethrough produces a bias voltage across said common cathode resistor; said push-pull amplifier being cut off by said bias voltage; and means connected in circuit with said electronic amplifier tube for rendering the latter non-conductive for predetermined periods of time whereby said bias voltage developed across said common cathode resistor decreases sufficiently to unblock said push-pull amplifier during those predetermined periods of time.

References Cited in the file of this patent

UNITED STATES PATENTS

| | | |
|---|---|---|
| 2,464,353 | Smith | Mar. 15, 1949 |
| 2,465,925 | Purington | Mar. 29, 1949 |
| 2,476,902 | Paine | July 19, 1949 |
| 2,560,587 | Miller | July 17, 1951 |
| 2,567,229 | Morse | Sept. 11, 1951 |
| 2,576,137 | Newitt | Nov. 27, 1951 |
| 2,597,005 | Kendall | May 20, 1952 |
| 2,666,190 | Ransom | Jan. 12, 1954 |
| 2,671,135 | Woodward | Mar. 2, 1954 |
| 2,755,455 | Gordon | July 17, 1956 |
| 2,757,284 | Hutchinson | July 31, 1956 |
| 2,777,018 | Russell | Jan. 8, 1957 |
| 2,787,707 | Cockburn | Apr. 2, 1957 |